United States Patent [19]
Nakazawa et al.

[11] Patent Number: 5,357,775
[45] Date of Patent: Oct. 25, 1994

[54] PROCESS FOR PRODUCING SUSPENSION COMPONENT OF LIGHT ALLOY

[75] Inventors: Yasushi Nakazawa; Yasunori Oku; Kaoru Kusaka, all of Wako, Japan

[73] Assignee: Honda Giken Kogyo Kabushiki Kaisha, Tokyo, Japan

[21] Appl. No.: 17,059

[22] Filed: Feb. 12, 1993

[30] Foreign Application Priority Data

Feb. 14, 1992 [JP] Japan .................................. 4-059260

[51] Int. Cl.⁵ .............................................. B21C 23/14
[52] U.S. Cl. ........................................ 72/254; 72/256; 72/371
[58] Field of Search ........................ 72/254, 256, 371; 29/175.1

[56] References Cited

U.S. PATENT DOCUMENTS

| | | | |
|---|---|---|---|
| 740,865 | 10/1903 | Jenkins | 29/175.1 |
| 1,347,137 | 7/1920 | Weaver | 72/371 |
| 3,508,427 | 4/1970 | Broderick | 72/254 |

*Primary Examiner*—Lowell A. Larson
*Attorney, Agent, or Firm*—Armstrong, Westerman, Hattori, McLeland & Naughton

[57] ABSTRACT

An upper arm 1 of a front suspension made of light alloy is provided with a lateral rubber bush mounting bore 2 connected to a vehicle body, and a vertical joint mounting bore 6 connected to a wheel support member. When forming the arm 1, a shape of the arm 1 is first determined such that the mounting bores 2 and 6 are directed in the same direction. Then, the arm 1 is extuded in an axial direction of the bores, and after cutting off the extruded material at a predetermined length, a portion of the mounting bore 2 is twisted by 90°. Therefore, the extrusion can be employed for producing the suspension arm made of light alloy without increasing a thickness thereof.

3 Claims, 2 Drawing Sheets

PROCESS FOR PRODUCING SUSPENSION COMPONENT OF LIGHT ALLOY

BACKGROUND OF THE INVENTION

1. Field of the Invention

The present invention relates to a process for producing a suspension component such as a link, an arm and the like used in a suspension of an automobile, and particularly, to a process for producing a suspension component made of light alloy such as aluminum alloy.

2. Description of the Prior Art

In automobiles, a light alloy such as an aluminum alloy has recently been employed even for arms as suspension components for the purpose of reducing the weight.

However, the suspension component is generally of a complicated shape. Therefore, if the component is intended to be formed into such a shape through a forging, a problem is encountered that it is necessary to use many dies through many steps, resulting in an increased manufacturing cost.

Thereupon, it has been conceived that in view of the fact that the light alloy is extrudable, a suspension component of a light alloy is Formed by an extrusion.

If the extrusion can be used in tills manner, a large number of the same components can be produced only by cutting the extruded product at a predetermined thickness, leading to a facilitated fabrication and a reduced manufacturing cost.

However, a shape which can be formed by the extrusion is limited only to a certain sectional shape which has no variation in an extruding direction. In most of the case, however, the suspension component is not formed into a shape with all of its individual portions directed to the same direction. For example, a suspension arm is pivotally connected at one end thereof to a vehicle body and at the other end to a wheel support member, respectively, through rubber bushes, but pivotal axes are not necessarily directed to the same direction, and in many cases, such axes may be directed to different directions. In such a case, it is required that axes of mounting bores provided in the suspension arm for press-fitting or fastening of the rubber bushes are directed to different directions. Therefore, even If the suspension arm is intended to be produced by an extrusion, It cannot be ensured that all of portions Including mounting bores can be formed by the extrusion.

Thereupon, in forming the suspension component by an extrusion, portions each having a direction different from an extruding direction such as bush mounting bores must be formed by a post-working. In such case, if the mounting bore, for example, the larger diameter mounting bore is intended to be formed vertically with respect to the extruding direction, the thickness of the component in the extruding direction must be larger than the diameter of the mounting bore. Moreover, it is required that a portion around the mounting bore has a strength enough to serve as a press-fitting portion or a fastening portion and hence, the thickness of such portion must be further increased. As a result, the entire component has an increased wall thickness, which is an obstacle to the reduction in weight.

From the above fact, it has been conventionally believed that little merit is obtained even if an extrusion is used for production of a suspension component.

SUMMARY OF THE INVENTION

The present invention has been accomplished with such circumstances in view, and it is an object of the present invention to provide a process for producing a suspension component of a light alloy, wherein a portion having a direction different from an extruding direction can be formed in the suspension component formed through an extrusion without increasing of the wail thickness of the component more than necessary, thereby reliably reducing the manufacturing cost and weight of the suspension component of the light alloy.

To achieve the above object, according to the present invention, there is provided a process for producing a suspension component made of light alloy having a portion which is directed in a different direction from other portions, comprising the steps of: determining a shape of a material of the suspension component into an extrudable shape by turning all of individual portions of the component into one direction, and subjecting the material to an extrusion; cutting off the extruded product at a predetermined thickness; and twisting a necessary portion of the cut product, thereby turning it to a required direction.

By extruding the material with individual portions such as mounting bores turned in the given direction in this manner, all of such portions are shaped by the extrusion. Therefore, these portions, for example, the portion around the mounting bore can be formed at any wall thickness and can be provided with a necessary strength. Moreover, such portion is formed by only twisting and hence, the strength thereof cannot be injured and rather, is increased by the twisting.

The portion formed with the direction different from the extruding direction is turned to such different direction by the twisting and therefore, it is unnecessary to increase the thickness in the extruding direction in order to form such portion. Thus, it is possible to prevent the increase in wall thickness of the entire component and to reliably provide a reduction in weight.

The above and other objects, features and advantages will become apparent from a consideration of the following description of the preferred embodiment, taken in conjunction with the accompanying drawings.

DESCRIPTION OF THE PREFERRED EMBODIMENT

The present invention will now be described by way of a preferred embodiment in connection with the accompanying drawings.

Figure 1:
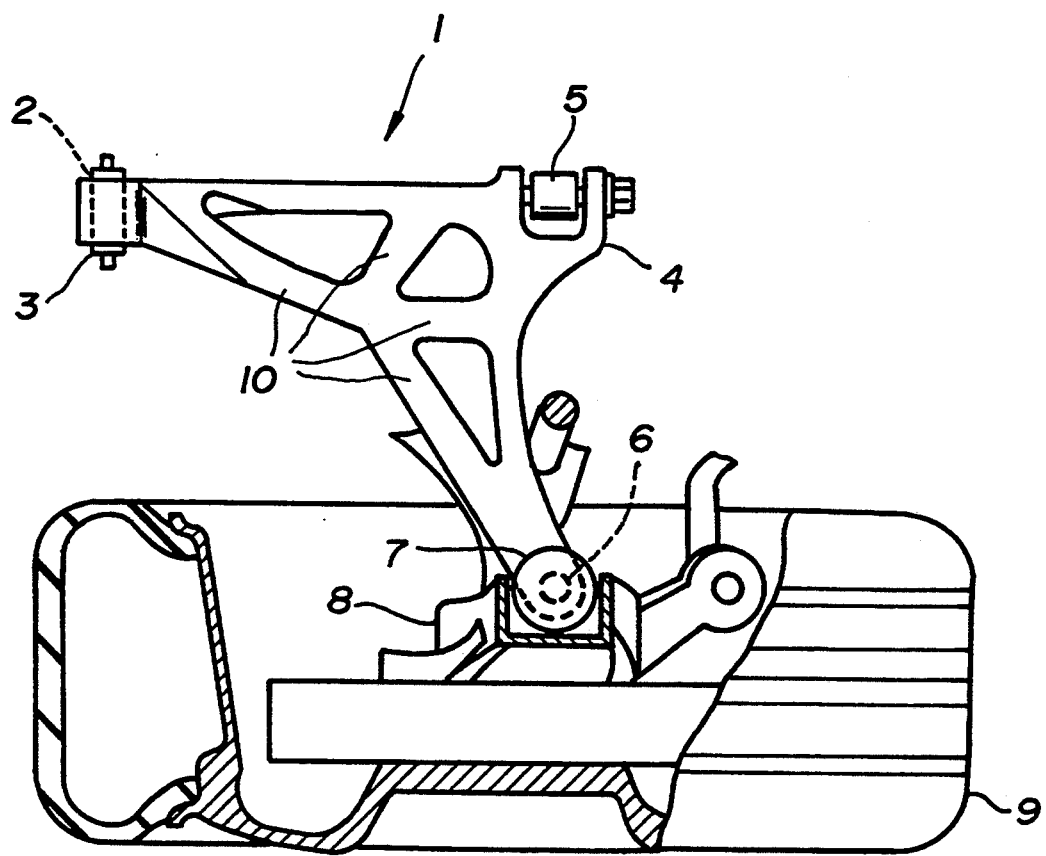
FIG. 1 is a plan view Illustrating one example of a suspension arm produced by a process according to the present invention.

FIG. 1 is a plan view illustrating one example of a suspension arm produced by a process according to the present invention.

As can be seen from FIG. 1, the suspension arm 1 is an upper arm of a double wishbone type front suspension for an automobile, and the arm 1 is substantially L-shaped as viewed in a plan view. The arm 1 is formed from aluminum alloy.

The arm 1 is provided at a front end thereof (i.e., left end as viewed in FIG. 1) with a mounting bore 2 of a relatively large diameter having a lateral axis. A rubber bush 3 is press-fitted in the mounting bore 2, and the arm 1 is vertically pivotally connected at the front end thereof to a vehicle body through the rubber bush 3.

The arm 1 is provided at an inner portion of a rear end thereof with a bifurcated rubber bush sampling portion 4 which is opened toward a central portion of the vehicle body. A rubber bush 5 is longitudinally inserted into the clamping portion 4 and has a shaft portion which is fastened at its front and rear portions. In this way, the arm 1 is vertically pivotally connected at the inner end of its rear end through the rubber bush 5 to the vehicle body.

The arm 1 is provided at an outer portion of the rear end thereof with a vertical mounting bore 6. A shaft portion of a ball joint 7 is inserted from the above through the mounting bore 6, so that the ball joint 7 is fixed to the arm 1 by fastening the shaft portion from the below. The ball joint 7 is connected to a wheel support member 8, so that a wheel 9 can be relatively displaced with respect to the vehicle body.

Figure 2:
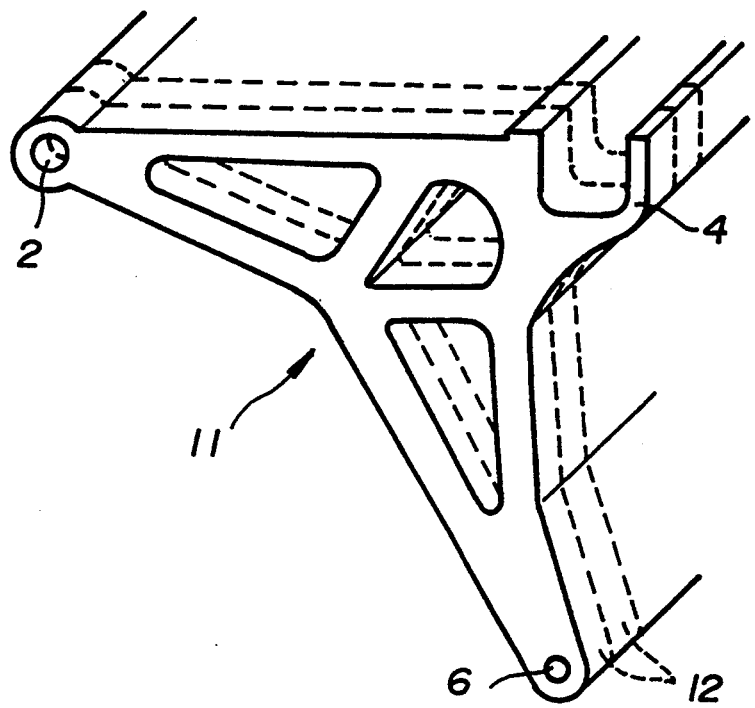
FIG. 2 is a perspective view illustrating an extruded product formed in the course of the production of the suspension arm.

In this way, the two mounting bores 2 and 6 whose axes are deviated by 90° from each other are provided in the arm 1. The rubber bush clamping portion 4 has a thickness In the same direction as the mounting bore 6. Sections in which the mounting bores 2 and 6 and the rubber bush clamping portion 4 are to be formed are connected together by auxiliary ribs 10.

in producing such a suspension arm 1, a shape of an entire arm 1 developed into a plane Is first established. In other words, time shape is established such that the axis of the mounting bore 2 turns to the same direction as that of the mounting bore 6. By establishing the shape of the entire are as described above, each of individual portions of the arm 1 has a uniform shape in one direction as shown in FIG. 2. This makes it possible to produce the arm 1 by extrusion. Thereupon, using a die having an opening of such a shape, an aluminum alloy material is extruded, thereby producing an extruded product 11 as shown in FIG. 2.

The extruded product 11 is cut off at a predetermined thickness as shown by dashed lines in FIG. 2 to provide a flat member 12.

Figure 3:
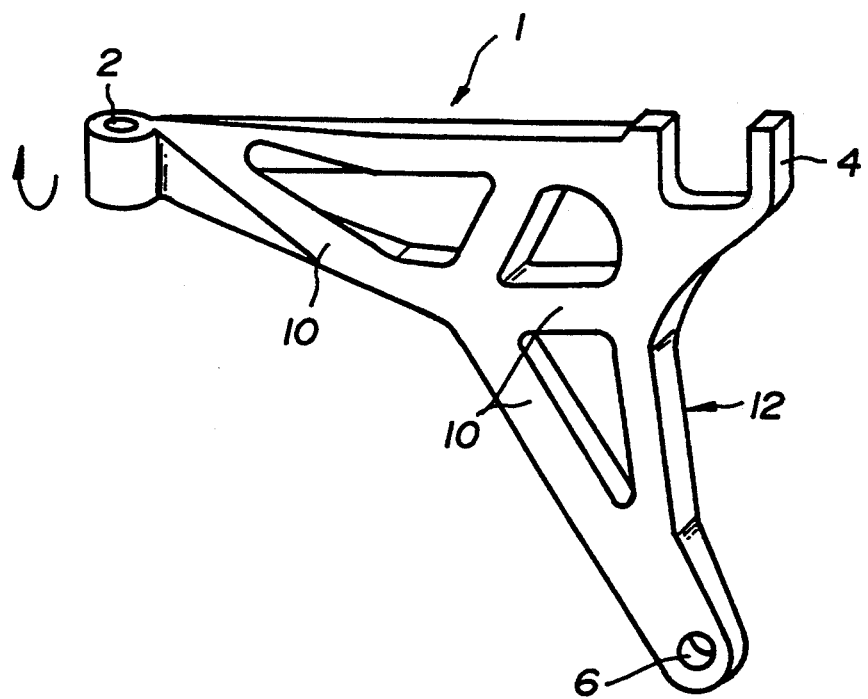
FIG. 3 is a view illustrating the state of working the suspension arm from the extruded product.

Then, a portion near the mounting bore 2 of the flat member 12 is twisted through 90° as shown in FIG. 3, thereby providing an arm 1 having a required shape.

In this manner, the suspension arm 1 is formed only by cutting off the extruded product 11 at the predetermined thickness and then subjecting a portion of the cut off product 12 to the twisting. Therefore, the arm fabricating process is significantly simplified, leading to a reduced manufacturing cost.

The mounting bore 2 is turned to a required direction by twisting the portion near the mounting bore 2. Therefore, in order to ensure that the large diameter mounting bore 2 forming 90° with respect to an extruding direction is formed, it is unnecessary to previously increase the thickness of the member 12 obtained by cutting off the extruded product 11. Thus, the arm 1 can be produced at a necessary minimum thickness, leading to a sufficient reduction in weight thereof.

The diametrical wall thickness of the portion around the mounting bore 2 of the arm 1 is determined depending upon the shape of the die used in the extrusion and hence, can be set at any value. This enables the portion around the mounting bore 2 of the arm 1 to have a strength such as required to serve as the rubber bush press-fitting portion, without increasing of the thickness of the arm 1 more than necessary.

If it is necessary to provide, in the rubber bush clamping portion 4, an insertion bore through which the shaft portion of the rubber bush 5 is inserted, then such insertion bore may be made by a post-working. The shaft portion of the rubber bush 5 generally has a small diameter and even in this case, it is unnecessary to particularly increase the thickness of the arm 1. However, if it is required to particularly increase the diameter of the insertion bore, an arm may be produced by extruding a material into a shape that the direction of an axis of an insertion bore coincides with an extruding direction, as is the mounting bore 2, cutting off an extruded product at a predetermined thickness, and longitudinally twisting a portion of a resulting flat member near the insertion bore through 90°.

If it is required to incline the shaft portion of the ball joint 7, a twisting or bending may be applied to a portion near the mounting bore 6 through which the shaft portion is inserted.

If the twisting is applied in this manner, one may consider that the strength of the arm 1 is reduced. However, the strength of the twisted portion is rather increased by the dislocation, but the toughness of such portion is reduced. Thereupon, the portion to be twisted is a portion as near as possible to the mounting bore 2 or the like requiring a strength, and the twisting of a central portion requiring a toughness should be averted.

Such a twisting increases the strength of a portion such as around the mounting bore 2 which is to be connected to another member, and yet insures the toughness required for the suspension arm 1.

Although the L-shaped suspension arm 1 having the two connections adjacent the vehicle body and the single connection adjacent the wheel has been described in the above embodiment, it will be understood that the present invention is applicable to a usual I-shaped arm.

The present invention is also applicable to another suspension component such as a link and a knuckle in addition to the arm.

As is apparent from the above description, according to the present invention, since the suspension component is formed into the shape with its individual portions turned to the same direction, the mounting bores or the like which are directed to different directions can be simultaneously formed by the extruding process. After extrusion, the extruded product is subjected to the cutting off and then to the twisting of a necessary portion to turn it to a required direction. Therefore, the suspension component is easy to fabricate, and the manufacturing cost thereof can be significantly reduced.

The wall thickness of the portion around the mounting bore can be set at any value. Moreover, the strength of such portion is increased by the twisting and therefore, the strength of the connections to the other members having the different directions can be insured without increasing of the thickness in the extruding direction. Thus, it is possible to minimize the thickness of the suspension component and to provide a reduction in weight thereof.

What is claimed is:

1. A process for producing a suspension component made of light alloy having a first part to be connected to a vehicle body, a second part to be connected to a wheel, and a central portion between the first part and the second part, said first and second parts being directed in a different direction from other portions, comprising the steps of:

determining a shape of a material of said suspension component into an extrudable shape by turning said first and second parts into a direction of other portions, and subjecting said material to an extrusion:

cutting off the extruded product at a predetermined thickness; and twisting said first and second parts of the cut off product while averting twisting in the central portion, thereby directing said first and second parts to a required direction.

2. A process for producing a suspension component made of light alloy having a portion which is directed in a different direction from other portions, comprising the steps of:

determining a sectional shape of a material of the suspension component to be extruded into an extrudable shape by developing the entire suspension component into a plane, and subjecting the material to an extrusion;

cutting off the extruded product at a predetermined thickness; and twisting a necessary portion of the cut off product, thereby turning the necessary portion to a required direction.

3. A process for producing a suspension component made of light alloy having a first part to be connected to a vehicle body, a second part to be connected to a wheel and a central portion between the first part and the second parts, said first and second parts being directed in a different direction from each other, comprising the steps of:

determining a shape of a material of said suspension component into an extrudable shape by turning said first or second part into the direction of the other part, and subjecting said material to an extrusion:

cutting off the extruded product at a predetermined thickness; and twisting said first part or second part of the cut off product while averting twisting in the central portion, thereby directing said first part or second part to a required direction.

* * * * *